United States Patent
Zalluhoglu et al.

(10) Patent No.: US 11,326,085 B2
(45) Date of Patent: May 10, 2022

(54) FRICTION REDUCERS

(71) Applicant: RHODIA OPERATIONS, Aubervilliers (FR)

(72) Inventors: Fulya Sudur Zalluhoglu, Humble, TX (US); Qing Wang, Spring, TX (US); Lanka Wickramasinghe Arachchilage, Spring, TX (US); Minh Le, Houston, TX (US); Jian Zhou, Langhorne, PA (US)

(73) Assignee: RHODIA OPERATIONS, Lyons (FR)

( * ) Notice: Subject to any disclaimer, the term of this patent is extended or adjusted under 35 U.S.C. 154(b) by 0 days.

(21) Appl. No.: 16/825,110

(22) Filed: Mar. 20, 2020

(65) Prior Publication Data
US 2020/0299561 A1     Sep. 24, 2020

Related U.S. Application Data

(60) Provisional application No. 62/821,810, filed on Mar. 21, 2019.

(51) Int. Cl.
*C09K 8/035* (2006.01)
*C09K 8/74* (2006.01)

(52) U.S. Cl.
CPC ............ *C09K 8/035* (2013.01); *C09K 8/74* (2013.01); *C09K 2208/28* (2013.01)

(58) Field of Classification Search
CPC ....... C09K 2208/28; C09K 8/035; C09K 8/74
See application file for complete search history.

(56) References Cited

U.S. PATENT DOCUMENTS

| | | |
|---|---|---|
| 3,067,987 A | 12/1962 | Ballou et al. |
| 3,284,393 A | 11/1966 | Vanderhof et al. |
| 3,624,019 A | 11/1971 | Oswego et al. |
| 4,024,097 A | 5/1977 | Slovinsky et al. |
| 4,051,065 A | 9/1977 | Venema |
| 4,059,552 A | 11/1977 | Zweigle et al. |
| 4,419,344 A | 12/1983 | Strasilla et al. |
| 4,522,502 A | 6/1985 | Brazelton |
| 4,642,222 A | 2/1987 | Brazelton |
| 4,672,090 A | 6/1987 | Chan |
| 4,713,431 A | 12/1987 | Bhattacharyya et al. |
| 4,747,691 A | 5/1988 | Hoffland |

(Continued)

FOREIGN PATENT DOCUMENTS

WO    2016075052 A1    5/2016

OTHER PUBLICATIONS

M. V. Achkeevaa, N. V. Romanyuka, E. A. Frolovab, D. F. Kondakovs, D. M. Khomyakovc and V. P. Danilo; "About Deicing Properties of Sodium, Potassium, Magnesium, and Calcium Chlorides, Sodium Formate and Salt Compositions on Their Basis", 2015, Theoretical Foundations of Chemical Engineering, vol. 49, No. 5, pp. 481-484.

(Continued)

*Primary Examiner* — Frances Tischler
(74) *Attorney, Agent, or Firm* — Osha Bergman Watanabe & Burton LLP (57) ABSTRACT

Provided herein are friction reducer formulations including a formate salt and an inverting surfactant, and methods of manufacturing such formulations. Methods of using the friction reducer formulations, such as for treating subterranean formations, are also provided.

22 Claims, 2 Drawing Sheets

(56) References Cited

U.S. PATENT DOCUMENTS

| | | | |
|---|---|---|---|
| 4,772,659 | A | 9/1988 | Chan |
| 5,292,800 | A | 3/1994 | Moench et al. |
| 5,470,150 | A | 11/1995 | Pardikes |
| 6,825,301 | B1 | 11/2004 | Cerf et al. |
| 9,315,722 | B1 | 4/2016 | Jackson et al. |
| 2010/0137168 | A1 | 6/2010 | Quintero et al. |
| 2016/0017203 | A1 | 1/2016 | Frederick et al. |
| 2018/0244974 | A1* | 8/2018 | Sawant .................. C09K 8/82 |
| 2019/0048246 | A1 | 2/2019 | Chung et al. |
| 2019/0201858 | A1* | 7/2019 | Braden ................. C02F 1/547 |

OTHER PUBLICATIONS

International Search Report issued in corresponding International Application No. PCT/US2020/023814; dated Jul. 16, 2020 (6 pages).
Written Opinion of the International Searching Authority issued in corresponding International Application No. PCT/US2020/023814; dated Jul. 16, 2020 (5 pages).
International Preliminary Report on Patentability issued in corresponding International Application No. PCT/US2020/023814; dated Jul. 16, 2020 (6 pages).

\* cited by examiner

# FRICTION REDUCERS

CROSS-REFERENCE TO RELATED APPLICATION

The present application claims the benefit of priority under 35 U.S.C. § 119(e) of U.S. Provisional Application Ser. No. 62/821,810, filed on Mar. 21, 2019, the entire disclosure of which is incorporated herein by reference.

TECHNICAL FIELD

The present disclosure relates to a diluted friction reducer and a formulation thereof. The present disclosure particularly relates to the friction reducer formulation including a formate salt and an inverting surfactant, a method of manufacturing the friction reducer formulation, and a method of using the friction reducer formulation.

BACKGROUND

In the drilling, for example, during subterranean formation or stimulation of oil and gas wells, well treatment fluids are often pumped into well bore holes under high pressure and at high flow rates causing the rock formation surrounding the well bore to fracture. As the fluid is pumped through the pipe at high flow rates (e.g., thousands of GPM), there is a significant amount of frictional resistance, which results in large energy requirements.

In order to reduce the friction between the well treatment fluid and the bore linings, friction reducers have been combined with the treatment fluids and added during pumping so as to reduce pump pressure. However, such friction reducers often lack adequate friction reducing properties such as, for example, pour point, freeze-thaw stability, and friction reduction performance. Accordingly, there remains a need for improved friction reducers and methods of making friction reducers.

SUMMARY

In an aspect, a friction reducer formulation is provided. The friction reducer formulation includes a water-in-oil emulsion having an oil phase (O) and an aqueous phase (A). The oil phase (O) includes an inert hydrophobic liquid, and the aqueous phase (A) includes a water, a friction reducing polymer, and a first surfactant. The friction reducer formulation also includes a diluting formulation and a second surfactant. The diluting formulation includes a formate salt. The first surfactant has a hydrophilic-lipophilic balance (HLB) value less than a HLB value of the second surfactant.

In embodiments, the formate salt includes potassium formate, sodium formate, or a combination thereof.

In embodiments, the friction reducing polymer includes an anionic polymer, a cationic polymer, or an amphoteric polymer.

The cationic polymer may include one or more monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide.

The anionic polymer may include one or more selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

The amphoteric polymer can include one or more one or more cationic monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide, and one or more anionic monomers selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

In embodiments, the friction reducing polymer has a molecular weight in the range of from about 1,000,000 to about 20,000,000.

The first surfactant may include one or more of fatty acid esters of mono-, di- and polyglycerols, fatty amines, and fatty acid alkyloxylates.

The second surfactant may include one or more selected from polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide; condensation products of alkylphenols and ethylene oxide; condensation products of higher fatty acid amines with five, or more, ethylene oxide units; ethylene oxide condensation products of polyhydric alcohol partial higher fatty esters, and their inner anhydrides.

The inert hydrophobic liquid may include paraffinic hydrocarbons, napthenic hydrocarbons, or a mixture thereof.

In another aspect, a method of manufacturing a friction reducer is also provided. The method includes polymerizing one or more monomers in a water-in-oil emulsion to form a friction reducing polymer, wherein the water-in-oil emulsion includes an oil phase (O) and an aqueous phase (A). The oil phase (O) includes an inert hydrophobic liquid, and the aqueous phase (A) includes a water, a friction reducing polymer, and a first surfactant. The method also includes diluting the friction reducing polymer by adding a formulation including a formate salt, and adding a second surfactant. The first surfactant has a hydrophilic-lipophilic balance (HLB) value less than an HLB value of the second surfactant.

In embodiments, the formate salt includes potassium formate, sodium formate, or a combination thereof.

The friction reducing polymer may include an anionic polymer, a cationic polymer, or an amphoteric polymer.

The cationic polymer may include one or more monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide.

The anionic polymer may include one or more selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

The amphoteric polymer may include one or more one or more cationic monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide, and one or more anionic monomers selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

In embodiments, the friction reducing polymer has a molecular weight in the range of from about 1,000,000 to about 20,000,000.

The first surfactant may include one or more of fatty acid esters of mono-, di- and polyglycerols, fatty amines, and fatty acid alkyloxylates.

The second surfactant may include one or more selected from polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide; condensation products of alkylphenols and ethylene oxide; condensation products of higher fatty acid amines with five, or more, ethylene oxide units; ethylene oxide condensation products of polyhydric alcohol partial higher fatty esters, and their inner anhydrides.

The inert hydrophobic liquid can include paraffinic hydrocarbons, napthenic hydrocarbons, or a mixture thereof.

In a further aspect, a method of treating a portion of a subterranean formation is provided. The method includes introducing a friction reducing formulation as described above into a portion of the subterranean formation.

DETAILED DESCRIPTION

Provided herein, inter alia, are methods for improving friction reducer (FR) formulations having improved properties, e.g., pour point, freeze-thaw stability, and friction reduction performance, by using a formate salt or formate brine.

Provided herein are formulations and methods for improving friction reducer properties by using formate brines which are included in an emulsion (water-in-oil emulsion) to form a friction reducing polymer. Particularly, the formate brine improves the pour point, freeze-thaw stability, and friction reduction performance. The method may further provide an improvement over inverting an inverse emulsion including a friction reducing copolymer in the absence of brine. Combining the friction reducing polymer and the formate brine may provide a synergistic effect that improves the pour point, freeze-thaw stability, and friction reduction performance.

The term "formate brine" as used herein refers to a material including a formate salt, which may be in a form of a solution or aqueous solution. In certain embodiments of the present disclosure, the formate brine including the formate salt may be used interchangeably as directed to a component in a specific process, such as diluting process.

Other than in the operating examples, or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Formulation

In an aspect, provided is a friction reducer formulation including a formate salt. For example, when a formate brine is introduced, the pour point may be significantly improved and improved freeze-thaw stability of the formulation may be provided. As such, the formate brine may improve the performance without sacrificing the pour point and stability.

In an aspect, provided is a friction reducer formulation that includes: a water-in-oil emulsion having an oil phase (O) and an aqueous phase (A); a diluting formulation including a formate salt; and a second surfactant. The oil phase (O) includes an inert hydrophobic liquid, and the aqueous phase (A) includes a water, a friction reducing polymer, and a first surfactant. The first surfactant has a hydrophilic-lipophilic balance (HLB) value less than a HLB value of the second surfactant.

In embodiments, the friction reducing polymer includes an anionic polymer, a cationic polymer, or an amphoteric polymer. In embodiments, the friction reducing polymer includes an anionic polymer. In embodiments, the friction reducing polymer includes a cationic polymer. In embodiments, the friction reducing polymer includes an amphoteric polymer.

As used herein, the term "polymer" is meant to encompass oligomer, and includes, without limitation, both homopolymers and copolymers. For instance, the polymer is not limited to polymers containing two types of monomeric units, but includes any combination of polymers, e.g., terpolymers, tetrapolymers, and the like.

Not being limited to any single theory, advantages of using the formate salts or formate brine may be based on the eutectic point of this salt forms. For instance, as shown in FIG. 4, formate brines have very low eutectic point at certain concentrations (e.g., −55° C. at 50 wt % concentration).

In embodiments, the formate salt may include ammonium formate, potassium formate, sodium formate, or a combination thereof. In embodiments, the formate salt includes potassium formate. In embodiments, the formate salt includes sodium formate. In embodiments, the formate salt may suitably include potassium formate and sodium formate at a weight ratio of about 1 to 100 or less, of about 1 to 90 or less, of about 1 to 80 or less, of about 1 to 70 or less, of about 1 to 60 or less, of about 1 to 50 or less, of about 1 to 40 or less, of about 1 to 30 or less, of about 1 to 20 or less, of about 1 to 10 or less, of about 1 to 5 or less, or of about 1 to 3 or less. In embodiments, the formate salt may suitably include sodium formate and potassium formate at a weight ratio of about 1 to 100 or less, of about 1 to 90 or less, of about 1 to 80 or less, of about 1 to 70 or less, of about 1 to 60 or less, of about 1 to 50 or less, of about 1 to 40 or less, of about 1 to 30 or less, of about 1 to 20 or less, of about 1 to 10 or less, of about 1 to 5 or less, or of about 1 to 3 or less.

In embodiments, the water-in-oil emulsion includes an oil phase (O) and an aqueous phase (A) as described herein. The oil phase (O) includes an inert hydrophobic liquid, and the aqueous phase (A) includes a water, a friction reducing polymer, and a first surfactant. Particularly, the first surfactant has a hydrophilic-lipophilic balance (HLB) value less than a HLB value of the second surfactant (i.e. inverting surfactant). In certain embodiments of the present disclosure, the second surfactant may be used interchangeably with the inverting surfactant, which may be directed to a component in the inverting process.

In embodiments, the oil phase (O) and the aqueous phase (A) may be present at an O/A ratio, based on the volume of each phase of from at least about 1:8, in some cases at least about 1:6 and in other cases at least about 1:4 and may be up to about 10:1, in some cases up to about 8:1 and in other cases up to about 6:1. When the O/A ratio is too oil heavy, the polymer may be too concentrated in the aqueous phase. When the O/A ratio is too water heavy, the emulsion may become unstable and prone to separate. The O/A ratio may be any ratio or range between any of the ratios recited above.

In embodiments, the oil phase in the water-in-oil emulsion is present as a continuous phase and includes an inert hydrophobic liquid. The inert hydrophobic liquid may include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils such as the branch-chain isoparaffinic solvent available as ISOPAR® M and EXXATE® available from ExxonMobil Corporation, Irving Tex., a narrow fraction of a branch-chain hydrocarbon available as KENSOL® 61 from Witco Chemical Company, New York, N.Y., mineral oil, available commercially as BLANDOL® from Witco, CALUME™ LVP-100 available from Calumet Specialty Products, Burnham, Ill., DRAKEOL® from Penreco Partnership, Houston, Tex., MAGIESOL® from Magie Bros., Oil City, Pa. and vegetable oils such as canola oil, coconut oil, rapeseed oil and the like.

In embodiments, the inert hydrophobic liquid may be suitably present in the water-in-oil emulsion in an amount sufficient to form a stable emulsion. In embodiments, the inert hydrophobic liquid may be present in the water-in-oil emulsions in an amount in the range of from about 15% to about 80% by weight.

In embodiments, the inert hydrophobic liquid may be present in the water-in-oil emulsion at a level of at least about 15, at least about 17.5, or at least about 20 weight percent based on the weight of the water-in-oil emulsion. In embodiments, the inert hydrophobic liquid may be present in the water-in-oil emulsion at up to about 80, up to about 60, up to about 40, or up to about 30 weight percent based on the weight of the water-in-oil emulsion. The total amount of inert hydrophobic liquid in the water-in-oil emulsion may be any value or may range between any of the values recited above.

In embodiments, any suitable water-in-oil emulsifier may be used as the one or more surfactants (e.g., first surfactant) used to form the water-in-oil emulsion including the friction reducing polymer. In embodiments, the surfactants may have an HLB (hydrophilic-lipophilic balance) value between about 2 and 10, between about 3 and 9 or between about 3 and 7. In embodiments, the first surfactant may have an HLB (hydrophilic-lipophilic balance) value between about 2 and 10, between about 3 and 9, or between about 3 and 7. In embodiments, the second surfactant has the greater HLB value than the HLB value of the first surfactant. In embodiments, the first surfactant has a hydrophilic-lipophilic balance (HLB) value less than a HLB value of the second surfactant (i.e. inverting surfactant). In embodiments, the second surfactant may have an HLB value from about 12 to 14.

As used herein, HLB is calculated using the method of calculating a value based on the chemical groups of the molecule. The method uses the following equation: $HLB = 7 + m*Hh + n*Hl$ where m represents the number of hydrophilic groups in the molecule, Hh represents the value of the hydrophilic groups, n represents the number of lipophilic groups in the molecule and Hl represents the value of the lipophilic groups.

Non-limiting examples of suitable surfactants (e.g., first surfactant) include: fatty acid esters of mono-, di- and polyglycerols, fatty amines, and fatty acid alkyloxylates. For example, the first surfactant may include, but is not limited to, the monoleate, the dioleate, the monostearate, the distearate and the palmitostearate. These esters may be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol; fatty acid esters of sorbitan, for instance sorbitan monoleate, sorbitan dioleate, sorbitan trioleate, sorbitan monostearate and sorbitan tristearate; fatty acid esters of mannitol, for instance mannitol monolaurate or mannitol monopalmitate; fatty acid esters of pentaerythritol, for instance pentaerythritol monomyristate, pentaerythritol monopalmitate and pentaerythritol dipalmitate; fatty acid esters of polyethylene glycol sorbitan, more particularly the monooleates; fatty acid esters of polyethylene glycol mannitol, more particularly the monooleates and trioleates; fatty acid esters of glucose, for instance glucose monooleate and glucose monostearate; trimethylolpropane distearate; the products of reaction of isopropylamide with oleic acid; fatty acid esters of glycerol sorbitan; ethoxylated alkylaines; sodium hexadecyl phthalate; sodium decyl phthalate; and oil-soluble alkanolamides.

In embodiments, the surfactants may include ethoxylated nonionic surfactants, guerbet alcohol ethoxylate, and mixtures thereof. Specific examples include, but are not limited to, tall oil fatty acid diethanolamine, such as those available as AMADOL® 511, from Akzo Nobel Surface Chemistry, Chicago, Ill.; polyoxyethylene (5) sorbitan monoleate, available as TWEEN® 81, from Uniqema, New Castle, Del.; sorbinate monoleate, available as SPAN® 80 from Uniquena, and ALKAMULS® SMO, from Rhone Poulenc, Inc., Paris, France.

In embodiments, the surfactants may be present at a level of at least about 0.1, at least about 0.25, at least about 0.5, at least about 0.75, or at least about 1 weight percent of the water-in-oil emulsion. When the amount of surfactants is less than the predetermined amount, e.g., less than about 0.1 weight percent, the aqueous phase may not be adequately dispersed in the oil phase and/or the water-in-oil emulsion may tend to separate into oil and aqueous phases. In embodiments, the surfactants may be present up to about 7, up to about 5, or up to about 2.5 weight percent of the water-in-oil emulsion. The amount of surfactants in the water-in-oil emulsion may be any value or range between any of the values recited above.

In embodiments, the aqueous phase is a dispersed phase of distinct particles in the oil phase and includes water and a water soluble polymer. In embodiments, the aqueous phase in total may be present in the water-in-oil emulsion polymer composition at a level of at least about 65, at least about 67.5, or at least about 70 weight percent based on the weight of the water-in-oil emulsion. In embodiments, the aqueous phase in total may be present at up to about 85, up to about 82.5, up to about 80, or up to about 77.5 weight percent based on the weight of the water-in-oil emulsion. The total amount of aqueous phase in the water-in-oil emulsion may be any value or may range between any of the values recited above.

In embodiments, the friction reducing polymer may be present at a level of at least about 10, at least about 12.5, or particularly at least about 15 weight percent based on the weight of the water-in-oil emulsion. In embodiments, the friction reducing polymer may be present at a level at up to about 25, up to about 22, up to about 21, or up to about 20 weight percent based on the weight of the water-in-oil emulsion. When the amount of friction reducing polymer is less than the predetermined amount, e.g., less than about 10 weight percent, the use of the water-in-oil emulsion, for example, in the method of treating a portion of a subterranean formation, may be uneconomical. When the amount of the friction reducing polymer is greater than the predetermined amount, e.g., greater than about 25 weight percent, the performance of the water soluble polymer in the present method of treating a portion of a subterranean formation may be less than optimum. The amount of the friction reducing polymer in the aqueous phase of the water-in-oil emulsion may be any value or range between any of the values recited above.

In embodiments, the friction reducing polymer may be present at a level of at least about 10, at least about 15, or at least about 20 weight percent based on the weight of the water-in-oil emulsion. In embodiments, the friction reducing polymer may be present at up to about 35, or up to about 30 weight percent based on the weight of the water-in-oil emulsion. In certain embodiments, the amount of the friction reducing polymer in the friction reducer formulation may be typically less than about 0.01%, based on the weight of the friction reducer formulation.

In an exemplary embodiment, the friction reducing polymers may be the dispersed aqueous phase of the water-in-oil emulsion and provide a greater friction reducing effect by reducing the energy losses due to friction in the friction reducer formulation or aqueous treatment fluids. In embodiments, the friction reducing polymers are the water soluble polymers. As a non-limiting example, the water soluble polymers may reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore.

The water-in-oil emulsion containing the friction reducing polymer may be prepared using water-in-oil emulsion polymerization techniques. Any suitable methods to effect such polymerizations may be used. Non-limiting examples of such methods are disclosed in U.S. Pat. Nos. 3,284,393; 4,024,097; 4,059,552; 4,419,344; 4,713,431; 4,772,659; 4,672,090; 5,292,800; and 6,825,301, the relevant disclosures of which are incorporated herein by reference.

Typically, the water-in-oil polymerization is carried out by mixing the surfactants with the oil phase, which contains the inert hydrophobic liquid. The aqueous phase is then prepared combining a monomer mixture with water in the desired concentration. Additionally, a chelating agent such as a sodium salt of ethylenediaminetetraacetic acid (EDTA) may optionally be added to the aqueous phase and the pH of the aqueous phase may be adjusted to 3.0 to 10.0, depending on the particular monomer(s) in the monomer mixture. The aqueous phase is then added to the mixture of oil phase and surfactants. The surfactants enable the aqueous phase, which contains the monomer mixture, to be emulsified into and form discrete particles in the oil phase. Polymerization is then carried out in the presence of a free radical generating initiator.

In embodiments, any suitable initiator may be used. Non-limiting examples of suitable initiators include diethyl 2,2'-azobisisobutyrate, dimethyl 2,2'-azobisisobutyrate, 2-methyl 2'-ethyl azobisisobutyrate, benzoyl peroxide, lauroyl peroxide, sodium persulfate, potassium persulfate, tert-butyl hydroperoxide, dimethane sulfonyl peroxide, ammonium persulfate, azobisisobutylronitrile, dimethyl 2,2'-azobis(isobutyrate) and combinations thereof. In embodiments, the amount of initiator may be from about 0.01 to 1% by weight of the monomers, or from 0.02% to 0.5% by weight of the monomers.

In embodiments, the polymerization technique may have an initiation temperature of about 25° C. and proceed approximately adiabatically. In other embodiments of the invention, the polymerization may be carried out isothermally at a temperature of about from 37° C. to about 50° C.

The composition of the friction reducing polymer may be the same or about the same as the composition of the monomer mixture.

In embodiments, the monomer mixture includes from about 1 to about 60 weight percent of one or more cationic monomers. In embodiments, the monomer mixture includes from about 1 to about 40 weight percent of one or more cationic monomers. In other embodiments, the monomer mixture includes from about 1 to about 30 weight percent of one or more cationic monomers. All amounts are by total weight of the monomer mixture.

In embodiments, the cationic polymer includes one or more monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide. In embodiments, the (meth)acrylamidopropyltrimethyl ammonium halide is (meth)acrylamidopropyltrimethyl ammonium chloride ("MAPTAC"). In embodiments, the (meth)acryloyloxyethyltrimethyl ammonium halide is acryloyloxyethyltrimethyl ammonium chloride ("AETAC"). In embodiments, the diallyl dimethyl ammonium halide is diallyl dimethyl ammonium chloride ("DADMAC").

In embodiments, the anionic polymer includes one or more monomers selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

The friction reducing polymer may include other polymers to provide desirable properties to the polymer. Non-limiting examples of suitable other polymers that may be included in the monomer mixture, and ultimately the resulting friction reducing polymer include amphoteric polymers. Non-limiting examples of amphoteric polymers include: i) one or more cationic monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide; and ii) one or more anionic monomers selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

In embodiments, the water-in-oil emulsion may include a salt. Among other things, the salt may be present to add stability to the emulsion and/or reduced viscosity of the emulsion. Examples of suitable salts, include, but are not limited to, ammonium chloride, potassium chloride, sodium chloride, ammonium sulfate, and mixtures thereof. In embodiments, the salt may be present in the emulsions in an amount in the range of from about 0.5% to about 2.5% by weight of the emulsion.

In embodiments, the water-in-oil emulsions may include an inhibitor. Among other things, the inhibitor may be included to prevent premature polymerization of the monomers prior to initiation of the emulsion polymerization reaction. The water soluble polymer may be synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor may be present in an amount sufficient to provide the desired prevention of premature polymerization. In some embodiments, the inhibitor may be present in an amount in the range of from about 0.001% to about 0.1% by weight of the emulsion.

The friction reducing polymers may have a molecular weight sufficient to provide a desired level of friction reduction. In embodiments, the friction reducing polymers have a higher molecular weight in order to provide a desirable level of friction reduction. As a non-limiting example, the weight average molecular weight of the friction reducing polymers may be in the range of from about 1,000,000 to about 20,000,000, as determined using intrinsic viscosities. Friction reducing copolymers having molecular weights outside the listed range may still provide some degree of friction reduction in an aqueous treatment fluid.

As used herein, intrinsic viscosity is determined using a Ubbelhhde Capillary Viscometer and solutions of the water soluble polymer in 1 M NaCl solution, at 30° C., and pH 7 at 0.05 wt. %, 0.025 weight % and 0.01 weight % and extrapolating the measured values to zero concentration to determine the intrinsic viscosity. The molecular weight of the water soluble polymer is then determined using the Mark-Houwink equation as is known in the art.

Alternatively, the reduced viscosity of the water soluble polymer at 0.05 weight % concentration is used to measure molecular size. As such, the water soluble polymer has a reduced viscosity, as determined in an Ubbelohde Capillary Viscometer at 0.05% by weight concentration of the polymer in 1M NaCl solution, at 30° C., pH 7, of from about 10 to about 40 dl/g, in some cases from 15 to about 35 dl/g, and in other cases 15 to about 30 dl/g.

In embodiments, in order to induce, aid or facilitate the inversion, make down and dissolution of the friction reducing polymer, the second surfactant, i.e., an inverting surfactant, may be included in, or added to the water-in-oil emulsion. Among other things, the inverting surfactant may facilitate the inverting of the emulsion upon addition to make up water and/or the aqueous treatment fluids of the present invention. Upon addition to the aqueous treatment fluid, the water-in-oil emulsion should invert, releasing the copolymer into the aqueous treatment fluid.

Non-limiting examples of suitable inverting surfactants include, polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, and sorbitol-anhydride).

In embodiments, the inverting surfactants may include ethoxylated nonyl phenols, ethoxylated nonyl phenol formaldehyde resins, ethoxylated alcohols, nonionic surfactants with an HLB of from 12 to 14, and mixtures thereof.

A specific non-limiting example of a suitable inverting surfactant includes an ethoxylated $C_{12}C_{16}$ alcohol. The inverting surfactant may be present in an amount sufficient to provide the desired inversion of the emulsion upon contact with the water in the aqueous treatment fluid. In some embodiments, the inverting surfactant may be present in an amount in the range of from about 1% to about 5%, in some cases from about 1.5% to about 3.5% by weight of the water-in-oil emulsion.

In embodiments, the inverting surfactants are added to the water-in-oil emulsion after the polymerization of the friction reducing polymer is completed. In embodiments, the inverting surfactants are added to the water-in-oil emulsion after the polymerization and/or diluting the polymerized polymers (e.g., friction reducing polymer) are completed.

In embodiments, a batch method may be used to make down the water-in-oil emulsion. For example, the friction reducing polymer or water soluble polymer containing water-in-oil emulsion and water are delivered to a common mixing tank. Once in the tank, the solution is beat or mixed for a specific length of time in order to impart energy thereto. After mixing, the resulting solution must age to allow enough time for the molecules to unwind. This period of time is significantly reduced in the methods disclosed herein.

In embodiments, continuous in-line mixers as well as in-line static mixers may be used to combine the friction reducing polymer containing water-in-oil emulsion and water. Non-limiting examples of suitable mixers utilized for mixing and feeding are disclosed in U.S. Pat. Nos. 4,522,502; 4,642,222; 4,747,691; and 5,470,150. Non-limiting examples of suitable static mixers may be found in U.S. Pat. Nos. 4,051,065 and 3,067,987.

Once the water soluble polymer containing water-in-oil emulsion is made down into water, any other additives are added to the solution to form a treatment solution, which is then introduced into the portion of the subterranean formation.

Generally, the disclosed water soluble polymer may be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

The water used in the aqueous treatment fluids may be freshwater, saltwater (e.g., water containing one or more salts dissolved therein), brine (e.g., produced from subterranean formations), seawater, pit water, pond water-or-the like, or combinations thereof. Generally, the water used may be from any source, provided that it does not contain an excess of compounds that may adversely affect other components in the aqueous treatment fluid or the formation itself. The disclosed water soluble polymers are effective in all aqueous treating fluid waters.

The water soluble polymers should be included in the aqueous treatment fluids in an amount sufficient to provide the desired reduction of friction. In some embodiments, a water soluble polymer may be present in an amount that is at least about 0.0025%, in some cases at least about 0.003%, in other cases at least about 0.0035% and in some instances at least about 0.05% by weight of the aqueous treatment fluid and may be up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous treatment fluid. The amount of the water soluble polymers included in the aqueous treatment fluids may be any value or range between any of the values recited above.

In some embodiments, the water soluble polymer may be present in aqueous treatment fluids in an amount in the range of from about 0.0025% to about 0.025%, in some cases in the range of from about 0.0025% to less than about 0.01%, in other cases in the range of from about 0.0025% to about 0.009%, and in some situations in the range of from about 0.0025% to about 0.008%, by weight of the aqueous treatment fluid.

In embodiments, when the present water-in-oil emulsions are used, the amount of water soluble polymer in the aqueous treatment fluid may be at least about 5%, in some cases at least about 7.5%, in other cases at least about 10%, in some instances at least about 12.5%, in other instances at least about 15%, in some situations at least about 20%, and in other situations at least about 25% less than when water-in-oil emulsion containing a polymer of the same composition at a concentration of 30 weight percent or more are used in the in the aqueous treatment fluid.

In embodiments, the water-in-oil emulsions are used in the friction reducing treatment solution in an amount of at least about 0.1 gallons of water-in-oil emulsion per thousand gallons of aqueous treating fluid water (gpt), in some cases at least about 0.15 gpt, and in other cases at least about 0.2 gpt and may be up to about 2 gpt, in some cases up to about 1.75 gpt, in other cases up to about 1.5 gpt, in some instances up to about 1.25 gpt, and in other instances up to about 1.1 gpt. The amount of water-in-oil emulsion used in the friction reducing treatment solution may be any value or range between any of the values recited above.

The lower polymer usage as described herein results in significantly decreased formation damage, decreased flocculation in above ground fluid recycle operations, and is more environmentally friendly as lower levels of polymer are used. Additionally, the lower polymer dose may be delivered using existing equipment resulting in better performance with little or no capital cost requirement.

Additional additives may be included in the aqueous treatment fluids as deemed appropriate. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

The aqueous treatment fluids may be used in any subterranean treatment where the reduction of friction is desired. Such subterranean treatments include, but are not limited to, drilling operations, stimulation treatments (e.g., fracturing treatments, acidizing treatments, fracture acidizing treatments), and completion operations.

In some embodiments, a method of treating a portion of a subterranean formation includes providing the above-described aqueous treatment fluid and introducing the aqueous treatment fluid into the portion of the subterranean formation. In some embodiments, the aqueous treatment fluid may be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

Method of Manufacturing

In an aspect, provided is a method of manufacturing a friction reducer. The method includes the steps of: polymerizing one or more monomers in a water-in-oil emulsion to form a friction reducing polymer, diluting the polymerized friction reducing polymer by adding a formulation comprising a formate salt, and adding a second surfactant.

The formate brine, e.g., formate salt composition, is introduced during the dilution step after the polymerization is completed. The dilution step is necessary to reduce the polymer activity from the base polymer to the desired level. For instance, the diluting step in the manufacturing method may include using oil, low HLB surfactant, and brine. After the dilution step is completed, the emulsion is inverted using high HLB surfactants (i.e. inverting surfactants) to obtain the final formulation. In embodiments, as discussed above, the first surfactant has a hydrophilic-lipophilic balance (HLB) value less than a HLB value of the second surfactant (i.e. inverting surfactant).

In embodiments, the formate salt includes potassium formate, sodium formate, or a combination thereof.

In embodiments, the friction reducing polymer includes an anionic polymer, a cationic polymer, or an amphoteric polymer.

In embodiments, the cationic polymer includes one or more monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide.

In embodiments, the anionic polymer includes one or more selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

In embodiments, the amphoteric polymer includes: i) one or more cationic monomers selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide; and ii) one or more anionic monomers selected from acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

In embodiments, the friction reducing polymer has a molecular weight in the range of from about 1,000,000 to about 20,000,000.

In embodiments, the first surfactant comprises one or more of fatty acid esters of mono-, di- and polyglycerols, fatty amines, and fatty acid alkyloxylates. In embodiments, the second surfactant comprises one or more selected from polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide; condensation products of alkylphenols and ethylene oxide; condensation products of higher fatty acid amines with five, or more, ethylene oxide units; ethylene oxide condensation products of polyhydric alcohol partial higher fatty esters, and their inner anhydrides.

In embodiments, the inert hydrophobic liquid comprises paraffinic hydrocarbons, napthenic hydrocarbons, or a mixture thereof.

Method of Use

In an aspect, provided is a method of treating a portion of a subterranean formation that includes: providing a water-in-oil emulsion as described herein, inverting the water-in-oil emulsion to provide an aqueous treatment fluid that includes a polymer solution, and introducing the aqueous treatment fluid into the portion of the subterranean formation.

The aqueous treatment fluids of the present disclosure generally include water and a friction reducing copolymer. In embodiments, the water-in-oil emulsion may further include an oil phase, an aqueous phase, and at least one surfactant. In embodiments, the water-in-oil emulsion includes a first surfactant.

Also provided is a method of treating a portion of a subterranean formation that includes the steps of: (a) providing a water-in-oil emulsion as described herein; (b) inverting the water-in-oil emulsion by adding it to water at from about 0.1 to about 5 gallons of the water-in-oil emulsion per thousand gallons of water to form a friction reducing treatment solution containing from about 0.0005 weight percent to about 0.12 weight percent water soluble polymer based on the weight of the treatment solution; and (c) introducing the treatment solution into the portion of the subterranean formation.

In embodiments, the water-in-oil emulsion is added to water by inverting the emulsion to form a friction reducing treatment solution. As used herein, the terms "invert" and/or "inverting" refer to exposing the water-in-oil emulsion to conditions that cause the aqueous phase to become the continuous phase. This inversion releases the water soluble polymer into the makeup water.

Methods of inverting the water-in-oil emulsions containing friction reducing polymers or water soluble polymers are disclosed, as a non-limiting example, in U.S. Pat. No. 3,624,019.

Other aspects of the invention are disclosed infra.

EXAMPLES

The present disclosure will further be described by reference to the following examples. The following examples are merely illustrative and are not intended to be limiting. Unless otherwise indicated, all percentages are by weight of the total composition.

Testing Method

All the pour points were tested by both LAWLER DR-2H and PSL SYSTEMTECHNIK PPT 45150. In LAWLER DR-2H, the temperature was reduced by 3° C. for every 30 minutes. For the pour point, it was determined to be 3 degree above the freezing point of the emulsions. In PSL SYSTEMTECHNIK PPT 45150, the pour point testing followed ASTM 20 method.

A freezer was used for checking the freeze-thaw stability at a low temperature (e.g., −40° C.). The samples were left overnight in the freezer and let it warm to room temperature. This cycle was repeated 3 times.

An in-house friction loop was used to determine the products' friction reduction performance from fresh water up to 200K TDS water. The friction loop had an outer diameter of 5/16" and run at 4-5 gpm flow rate. The testing was performed at different loadings from 0.25 gpt to 1 gpt.

Chemicals and Compounds

Abbreviation and/or general nomenclature of the chemicals and compounds in the following examples are as follows:
Mineral oil (Distillates petroleum, hydrotreated light)
Emulsifier (Fatty acid ethoxylate)
Emulsifier (Sorbitan monooleate)
Emulsifier (Fatty acid diethanolamide)
Non-ionic surfactant (Ethoxylate of branched alkyl alcohol)
EDTA: Ethylenediaminetetraacetic acid
MEHQ: Hydroquinone monomethyl ether Example 1: Anionic Friction Reducer A high performance anionic friction reducer was designed to be used in fresh water and mid TDS (total dissolved solids) brines (up to 150K). It was a water-in-oil-type emulsion that was easily dispersed, inverted, and hydrated into fluid solution.

Anionic friction reducer that contained sodium chloride brine had high pour point (−14° C.) and it was not freeze-thaw stable (become gel when it is cold). It also had poor friction reduction performance. Using formate brine improved the pour point significantly (−37° C.) and the final emulsion was freeze thaw stable. The friction reduction performance was also improved.

Example 2: Amphoteric Friction Reducer

A high performance amphoteric friction reducer was designed to be used in fresh water and high TDS (total dissolved solids) brines (up to 300K). It was a water-in-oil-type cationic emulsion that was easily dispersed, inverted, and hydrated into fluid solution.

Amphoteric friction reducer that contained sodium chloride brine had high pour point (−14° C.) and it was not freeze-thaw stable (become gel when it is cold). Using formate brine improved the pour point significantly (−30° C.). The friction reduction performance was also improved.

Example 3: Synthesizing and Testing of Anionic Friction Reducer

The FR performance and product stability has been found to be improved by modifying the inverting surfactant and type of salt used in the dilution phase.
Anionic FR Base Synthesis: Preparation of Water-in-Oil Emulsion Polymers (30% Active)
1) Preparation typically included combining some or all of deionized water, acrylamide (AM), acrylic acid (AA), ammonium chloride, EDTA, MEHQ, sodium hydroxide and mixing until homogeneous to form aqueous phase. The oil phase was prepared by mixing mineral oil with the emulsifier surfactants (HLB<10) and stirring until blended. The pH of the aqueous phase was adjusted and it was then added to the oil phase and stirred to form a dispersion.
2) The dispersion was stirred under a nitrogen purge for 30 minutes and heated to appropriate initiation temperature. At this stage, 10 microliters of peroxide was added to the reaction vessel followed by 0.1% sodium metabisulfite (SMBS) being fed at 0.1 mL/min. upon initiation of exotherm, the reaction temperature was allowed to reach 50 degrees Celsius and controlled between 48-50° C. for the remainder of the exotherm. The feed rate of the SMBS was then increased to 1 mL/min followed by addition of a 34.71% SMBS scavenger at 1 mL/min.

Dilution (8% Active)
1) A dilution phase was prepared by mixing an oil phase, mineral oil and emulsifier surfactants (HLB<10), with a sodium and potassium formate and deionized water solution. The required amount of the dilution phase was added to the base, as prepared above, and mixed 30 min at 30° C.

Inversion
1) An appropriate non-ionic inverting surfactant (HLB>10) (ethoxylate of branched alkyl alcohol) was blended into the emulsion and the polymer was then cooled to room temperature.

Figure 1:
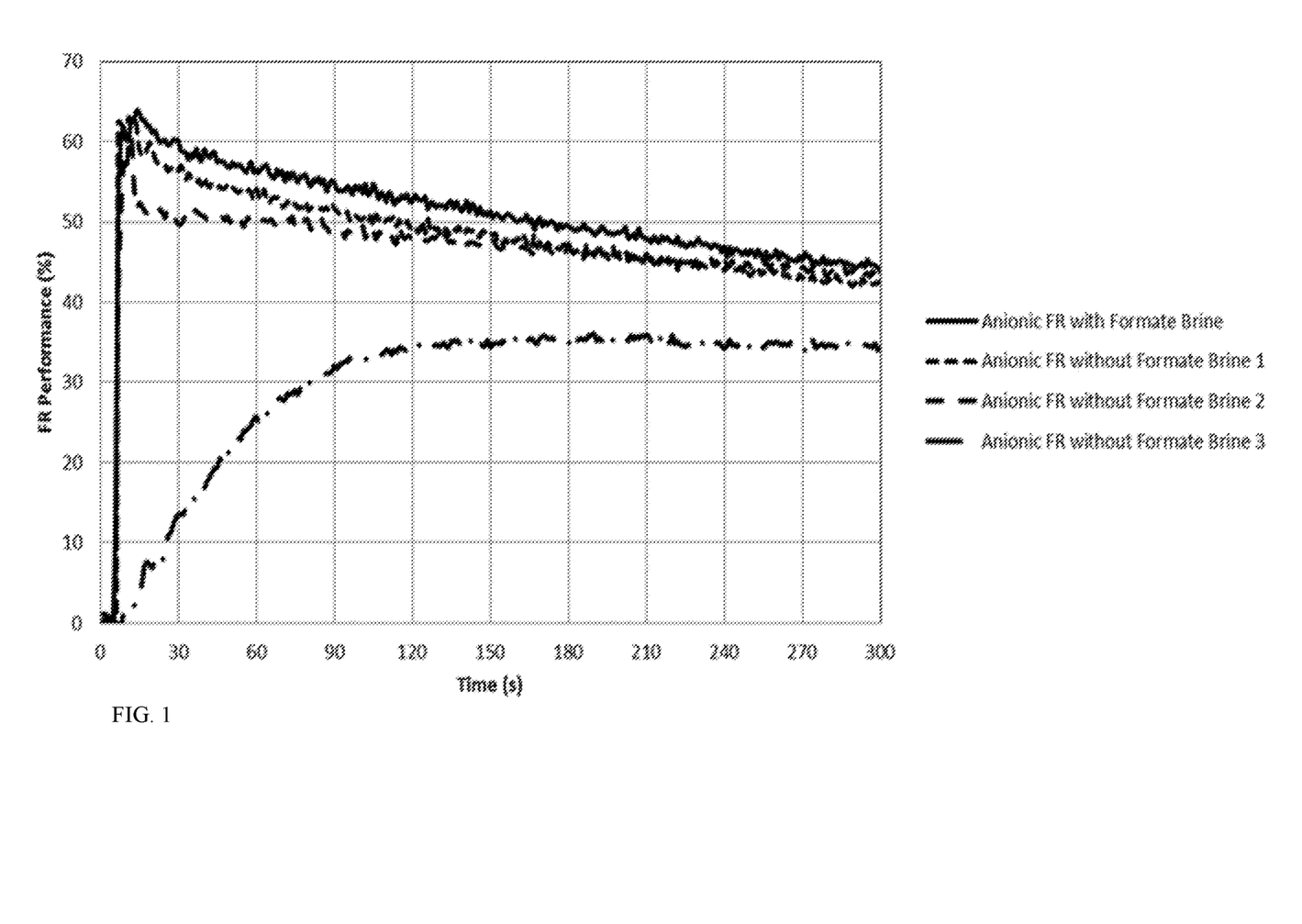
FIG. 1 shows a comparison of friction reduction performance for anionic friction reducers with and without formate brine.

FIG. 1 shows how the formate brine improved friction reduction performance.

Example 4: Synthesizing and Testing Amphoteric Friction Reducer

The pour point and FR performance have been found to be improved by modifying the inverting surfactant and type of salt used in the dilution phase.
Amphoteric FR Base Synthesis: Preparation of Water-in-Oil Emulsion Polymers (32% Active)
1) Preparation typically included combining some or all of deionized water, acrylamide (AM), acrylic acid (AA), AETAC, ammonium chloride, EDTA, MEHQ and mixing until homogeneous to form aqueous phase. The oil phase was prepared by mixing mineral oil with the emulsifier surfactants (HLB<10) and stirring until blended. The pH of the aqueous phase was adjusted and it was then added to the oil phase and stirred to form a dispersion.
2) The dispersion was stirred under a nitrogen purge for 30 minutes and heated to appropriate initiation temperature. At this stage, 10 microliters of peroxide was added to the reaction vessel followed by 0.1% sodium metabisulfite (SMBS) being fed at 0.1 mL/min. upon initiation of exotherm, the reaction temperature was allowed to reach 50 degrees Celsius and controlled between 48-50° C. for the remainder of the exotherm. The feed rate of the SMBS was then increased to 1 mL/min followed by addition of a 34.71% SMBS scavenger at 1 mL/min.

Dilution (20% Active)
1) A dilution phase was prepared by mixing an oil phase, mineral oil and emulsifier surfactants (HLB<10), with a potassium formate brine solution. The required amount of the dilution phase was added to the base, as prepared above, and mixed 30 min at 30° C.

Inversion

1) An appropriate non-ionic inverting surfactant (HLB>10) (ethoxylate of branched alkyl alcohol) was blended into the emulsion and the polymer was then cooled to room temperature.

Figure 2:
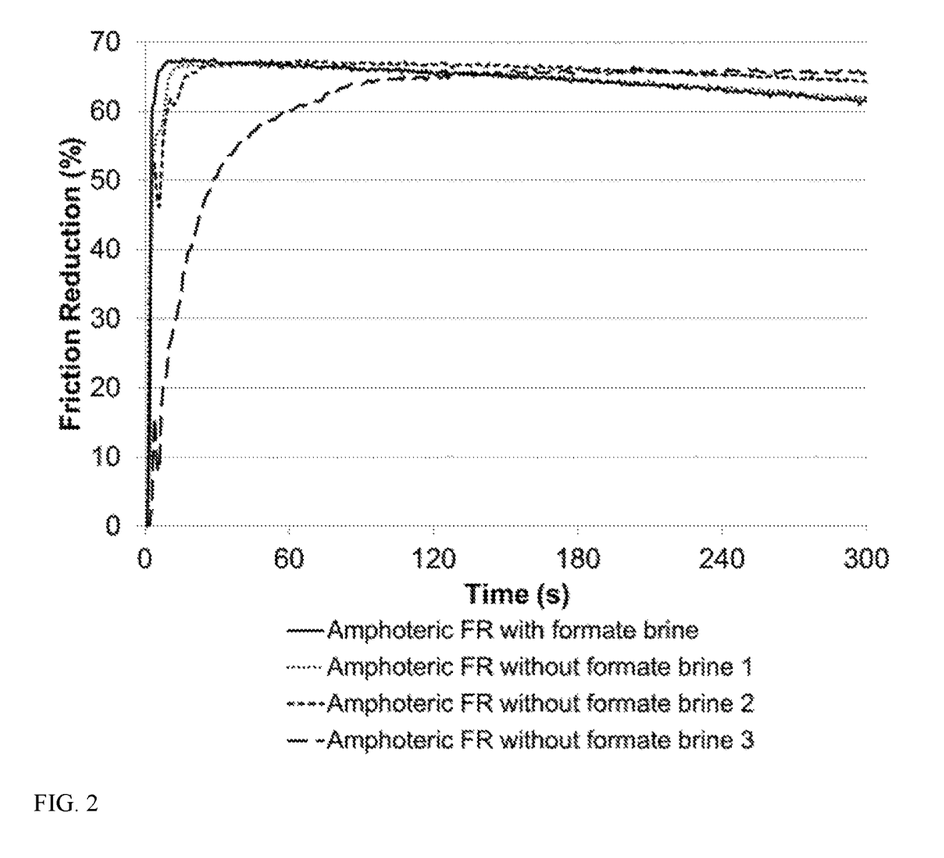
FIG. 2 shows a comparison of friction reduction (%) for amphoteric friction reducers with and without formate brine.

FIG. 2 shows that replacing sodium chloride brine with potassium formate brine improves the pour point of amphoteric FR from −14° C. to −30° C.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

What is claimed is:

1. A friction reducer formulation comprising:
   a water-in-oil emulsion having an oil phase (O) and an aqueous phase (A), wherein the oil phase (O) comprises an inert hydrophobic liquid, and the aqueous phase (A) comprises water, a friction reducing polymer, and a first surfactant;
   a diluting formulation comprising an oil, a surfactant with a hydrophilic-lipophilic balance (HLB) value<10, and a formate salt; and
   a second surfactant;
   wherein the first surfactant has a hydrophilic-lipophilic balance (HLB) value less than a HLB value of the second surfactant; and
   wherein the friction reducer formulation is freeze thaw stable.

2. The friction reducer formulation of claim 1, wherein the formate salt comprises potassium formate, sodium formate, or a combination thereof.

3. The friction reducer formulation of claim 1, wherein the friction reducing polymer comprises an anionic polymer, a cationic polymer, or an amphoteric polymer.

4. The friction reducer formulation of claim 3, wherein the cationic polymer comprises one or more monomers selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide.

5. The friction reducer formulation of claim 3, wherein the anionic polymer comprises one or more monomers selected from the group consisting of acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

6. The friction reducer formulation of claim 3, wherein the amphoteric polymer comprises:
   i) one or more cationic monomers selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine methyldiallylamine, dimethaminoethylmethacrylate, and dimethylaminopropylmethacrylamide; and
   ii) one or more anionic monomers selected from the group consisting of acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

7. The friction reducer formulation of claim 3, wherein the friction reducing polymer has a molecular weight in the range of from about 1,000,000 to about 20,000,000.

8. The friction reducer formulation of claim 1, wherein the first surfactant comprises one or more of fatty acid esters of mono-, di- and polyglycerols, fatty amines, and fatty acid alkyloxylates.

9. The friction reducer formulation of claim 1, wherein the second surfactant comprises one or more selected from the group consisting of ethoxylate of branched alkyl alcohol; polyoxyethyylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of fatty alcohols with ethylene oxide; condensation products of alkylphenols and ethylene oxide; condensation products of fatty acid amines with five, or more, ethylene oxide units; ethylene oxide condensation products of polyhydric alcohol partial fatty esters, and their inner anhydrides.

10. The friction reducer formulation of claim 1, wherein the inert hydrophobic liquid comprises paraffinic hydrocarbons, naphthenic hydrocarbons, or a mixture thereof.

11. A method of manufacturing a friction reducer according to claim 1, comprising:
polymerizing one or more monomers in a water-in-oil emulsion to form a friction reducing polymer wherein the water-in-oil emulsion comprises an oil (O) and an aqueous phase (A), the oil phase (O) comprises an inert hydrophobic liquid, and the aqueous phase (A) comprises water, a friction reducing polymer, and a first surfactant,
diluting the friction reducing polymer by adding a formulation comprising an oil, a surfactant with a hydrophilic-lipophilic balance (HLB) value<10, and a formate salt;
and
adding a second surfactant,
wherein the first surfactant has a hydrophilic-lipophilic balance (HLB) value less than a HLB value of the second surfactant; and
wherein the friction reducer formulation is freeze thaw stable.

12. The method of claim 11, wherein the formate salt comprises potassium formate, or a combination thereof.

13. The method of claim 11, wherein the friction reducing polymer comprises an anionic polymer, a cationic polymer, or an amphoteric polymer.

14. The method of claim 13, wherein the cationic polymer comprises one or more monomers selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide.

15. The method of claim 13, wherein the anionic polymer comprises one or more selected from the group consisting of acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

16. The method of claim 13, wherein the amphoteric polymer comprises:
i) one or more cationic monomers selected from the group consisting of (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide; and
ii) one or more anionic monomers selected from the group consisting of acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide.

17. The method of claim 11, wherein the first surfactant comprises one or more of fatty acid esters of mono-, di- and polyglycerols, fatty amines, and fatty acid alkyloxylates.

18. The method of claim 11, wherein the second surfactant comprises one or more selected from the group consisting of ethoxylate of branched alkyl alcohol; polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide; condensation products of alkylphenols and ethylene oxide; condensation products of higher fatty acid amines with five, or more, ethylene oxide units; ethylene oxide condensation products of polyhydric alcohol partial higher fatty esters, and their inner anhydrides.

19. The method of claim 11, wherein the inert hydrophobic liquid comprises paraffinic hydrocarbons, naphthenic hydrocarbons, or a mixture thereof.

20. A method of treating a portion of a subterranean formation comprising:
introducing a friction reducing formulation of claim 1 into a portion of the subterranean formation.

21. The friction reducer formulation of claim 1, wherein the friction reducer formulation has a pour point between −30° C. and −37° C.

22. The friction reducer formulation of claim 1, wherein the water-in-oil emulsion contains the formate salt in an amount ranging from about 0.5 to about 2.0% by weight of the emulsion.

* * * * *